US00RE46681E

(19) United States
(12) Reissued Patent
Choi

(10) Patent Number: US RE46,681 E
(45) Date of Reissued Patent: Jan. 23, 2018

(54) CRAMPONS PROVIDED WITH SPIKES

(71) Applicant: SNOWLINE CO., LTD., Pyeongtaesk-si (KR)

(72) Inventor: Jinhong Choi, Pyeongtaek-si (KR)

(73) Assignee: SNOWLINE CO., LTD., Pyeongtaesk-si (KR)

(21) Appl. No.: 15/214,178

(22) Filed: Jul. 19, 2016

Related U.S. Patent Documents

Reissue of:
(64) Patent No.: 7,428,788
Issued: Sep. 30, 2008
Appl. No.: 11/299,097
Filed: Dec. 9, 2005

(30) Foreign Application Priority Data

Jan. 19, 2005 (KR) ..... 20-2005-0001685 U

(51) Int. Cl.
*A43B 23/28* (2006.01)
*A43C 15/06* (2006.01)
*A43C 15/10* (2006.01)

(52) U.S. Cl.
CPC ..... *A43C 15/063* (2013.01); *A43C 15/066* (2013.01); *A43C 15/10* (2013.01)

(58) Field of Classification Search
CPC ..... A43C 15/063; A43C 15/10; A43C 15/066
See application file for complete search history.

(56) References Cited

U.S. PATENT DOCUMENTS

| | | | | | |
|---|---|---|---|---|---|
| 1,408,730 | A * | 3/1922 | Grein | 36/7.6 |
| 1,437,258 | A * | 11/1922 | Miller | 36/62 |
| 1,607,450 | A * | 11/1926 | Eubank | 36/62 |
| 2,084,671 | A * | 6/1937 | Curran | 36/7.6 |
| 2,511,191 | A * | 6/1950 | Young | 36/7.6 |
| 2,532,485 | A * | 12/1950 | Dowling | 36/59 R |
| 2,537,123 | A * | 1/1951 | Dowling, Sr. | 36/59 R |
| 2,538,182 | A * | 1/1951 | Young | 36/7.6 |
| 2,697,287 | A * | 12/1954 | Millard | 36/7.7 |
| 3,949,495 | A * | 4/1976 | Hollmann | 36/62 |
| 5,315,768 | A * | 5/1994 | Pacheco | 36/7.1 R |
| 5,909,945 | A * | 6/1999 | Noy | 36/7.6 |
| 5,921,005 | A * | 7/1999 | Bell et al. | 36/59 R |
| 5,966,840 | A * | 10/1999 | Bell et al. | 36/7.6 |
| 6,966,127 | B2 | 11/2005 | Petzl et al. | |
| 2003/0106243 | A1 | 6/2003 | Tucker | |
| 2007/0163146 | A1 * | 7/2007 | Brovkin | 36/7.6 |

FOREIGN PATENT DOCUMENTS

| | | |
|---|---|---|
| KR | 20-0252026 | 10/2001 |
| KR | 20-02520260000 | 10/2001 |
| KR | 20-02711140000 | 3/2002 |
| KR | 30-03021770000 | 6/2002 |
| KR | 30-03097370000 | 10/2002 |
| KR | 20-03015770000 | 1/2003 |

(Continued)

*Primary Examiner* — Joseph Kaufman

(74) *Attorney, Agent, or Firm* — Lucas & Mercanti, LLP

(57) ABSTRACT

Disclosed are chain-type crampons for preventing mountain-climbing boots from being slipped on a snowy road or icy road when climbing a mountain. The crampons having an elastic band and chains mounted on the band are provided with a plurality of spikes and link rings, so that a brake power on the snowy road or icy road is increased and snow is not adhered to the crampons.

14 Claims, 8 Drawing Sheets

(56) References Cited

FOREIGN PATENT DOCUMENTS

| | | |
|---|---|---|
| KR | 20-03122970000 | 4/2003 |
| KR | 30-03361830000 | 10/2003 |
| KR | 30-03363840000 | 10/2003 |
| KR | 20-03332520000 | 11/2003 |
| KR | 20-03623990000 | 9/2004 |
| KR | 20-03812770000 | 4/2005 |
| KR | 30-03021770001 | 2/2006 |

* cited by examiner

CRAMPONS PROVIDED WITH SPIKES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a reissue of U.S. Pat. No. 7,428,788, which issued from U.S. patent application Ser. No. 11/299,097, filed Dec. 9, 2005, which* claims the benefit of Korean patent application No. 20-2005-0001685, filed Jan. 19, 2005, *each of* which is hereby incorporated by reference in its entirety.

BACKGROUND OF THE INVENTION

1. Field of the Invention

The present invention relates to crampons for preventing mountain-climbing boots from being slipped on a snowy road or icy road when climbing a mountain in the winter season, and more particularly, to chain-type crampons having an elastic band and chains mounted on the band which are provided with a plurality of spikes and link rings, so that a brake power on a snowy road or icy road is increased and snows are not adhered to the crampons.

2. Background of the Related Art

In general, since temperatures are low, and snows and ices pile up on the ground, in the winter season, snowy roads or icy roads are formed on mountain passes. Climbers are frequently slipped on the snowy road or icy road through carelessness or beyond human control, when climbing a mountain, so that climbers are bruised or are seriously wounded, such as a fracture.

In order to prevent the emergency situations, most of the mountain-climbing boots are put on crampons. The climbers carry the crampons at ordinary times, and put the crampons on the boots in an area with snowy roads or icy roads, thereby keeping a body in safe and thus preventing the slip.

The existing crampons are generally put below a bottom surface of the boots to prevent the slip on the snowy roads or icy roads in the winter season. The crampons includes a body and a binding band, in which the body is downwardly bent to form about 4 to 6 spike edges at the bottom surface thereof, and the binding band is coupled to the body to tightly bind the body against the outsole of the boots, when the climber puts the crampons on the boots.

Recently, in order to shorten a time required to put the crampons on the boots or remove the crampons from the boots, the binding band of the crampons is provided with a fastening member having a hook and a coupling ring. For example, crampons capable of shortening the time required to put on the crampons is disclosed in Korean Utility Model Registration No. 20-0252026 entitled "Crampons", which is assigned to the same applicant and is incorporated herein by reference.

According to the crampons disclosed in the publication, an elastic band is bound around the upper portion of an outsole of mountain-climbing boots, and chains are coupled to the band as an anti-skid member. The chains are coupled to each other to partially cover the bottom surface of the boots, thereby preventing the slip of the boots due to the friction between the crampons and the snowy road or icy road.

When the climber puts the crampons on the boots, a front heel portion is firstly inserted in the widened elastic band, and the band is pulled to enable it to cover the upper portion of the outsole corresponding to a rear heel. The crampons are tightly attached to the boots due to the elastic force of the band, and the chains are disposed below the bottom surface of the boots.

The existing crampons have a discomfort drawback in that the snows are adhered to the chains when temperatures are low. Specifically, snows adhered between the chains are gradually getting bigger. Further, in case the chains disposed at the rear heel portion of the boots are applied with strong frictional force when climbing a steep slope, the band tightly covering the front heel portion of the boots is stretched, so that the wearing state of the band is deteriorated.

Also, in addition to the drawback that the snows are adhered between the chains to make the behavior discomfort, the brake power on the snowy road or icy road is remarkably decreased.

SUMMARY OF THE INVENTION

Accordingly, the present invention is directed to crampons for mountain-climbing boots that substantially obviates one or more problems due to limitations and disadvantages of the related art.

An object of the present invention is to provide chain-type crampons having an elastic band and chains mounted on the band which are provided with a plurality of spikes and link rings, so that a brake power on a snowy road or icy road is increased and snows are not adhered to the crampons.

To achieve the object and other advantages, according to one aspect of the present invention, there are provided chain-type crampons provided with spikes, in which an elastic band is bound around an outsole of mountain-climbing boots, and chains are coupled to the band as an anti-skid member, the crampons comprising: a front spike, a center spike, and a rear spike, respectively, disposed at a front portion, a center portion, and a rear portion of a bottom surface of the boots, engaged to the chain and coupling rings, and formed with a plurality of spike edges; lateral spikes disposed forward between the front spike and the center spike and engaged to the chain and the coupling ring; link rings each engaged to the front spike, the lateral spikes, and the center spikes; and a circular restraining bar coupled to the lateral spikes tightly attached to a front heel of the boots.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
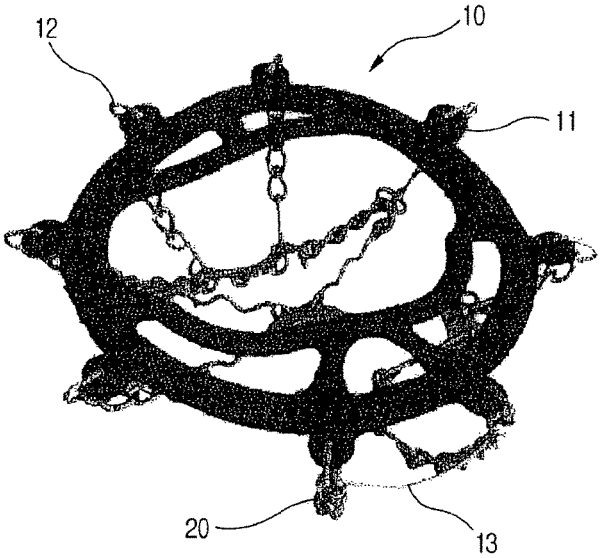
FIG. 1 is a perspective view illustrating crampons according to a first embodiment of the present invention.
Figure 2:
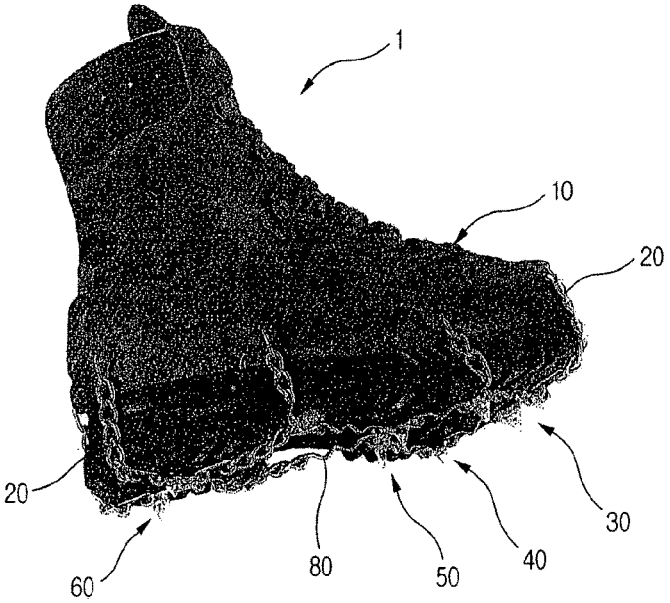
FIG. 2 is a side view illustrating the wearing state of the crampons according to a first embodiment of the present invention.
Figure 3:
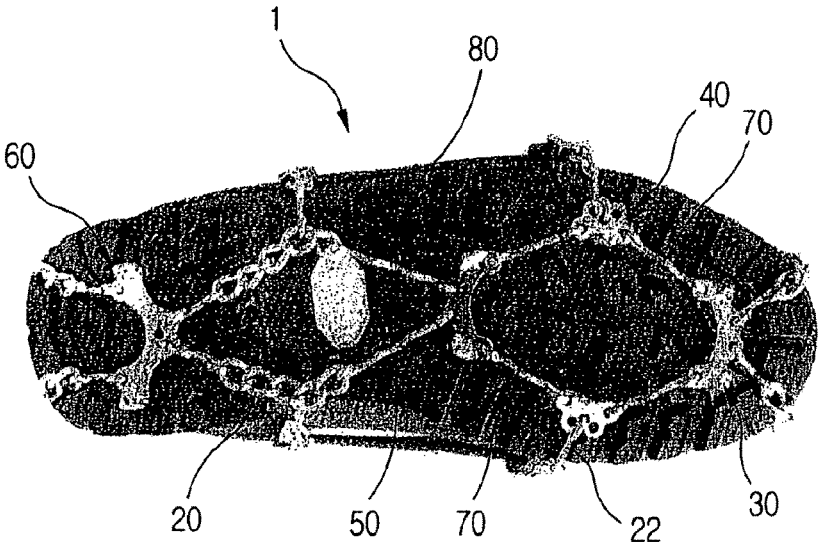
FIG. 3 is a bottom view illustrating the wearing state of the crampons according to a first embodiment of the present invention.
Figure 4:
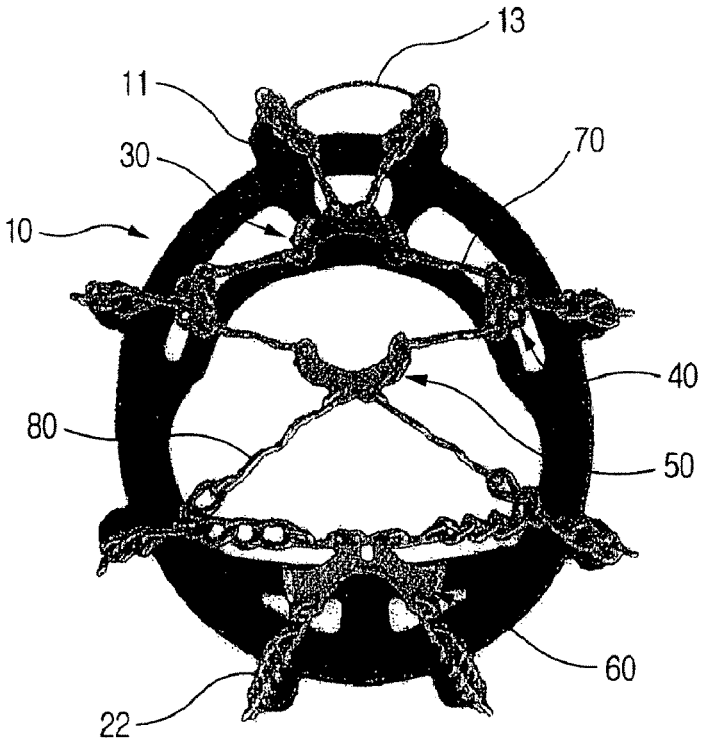
FIG. 4 is a bottom view illustrating the crampons according to a first embodiment of the present invention.
Figure 5:
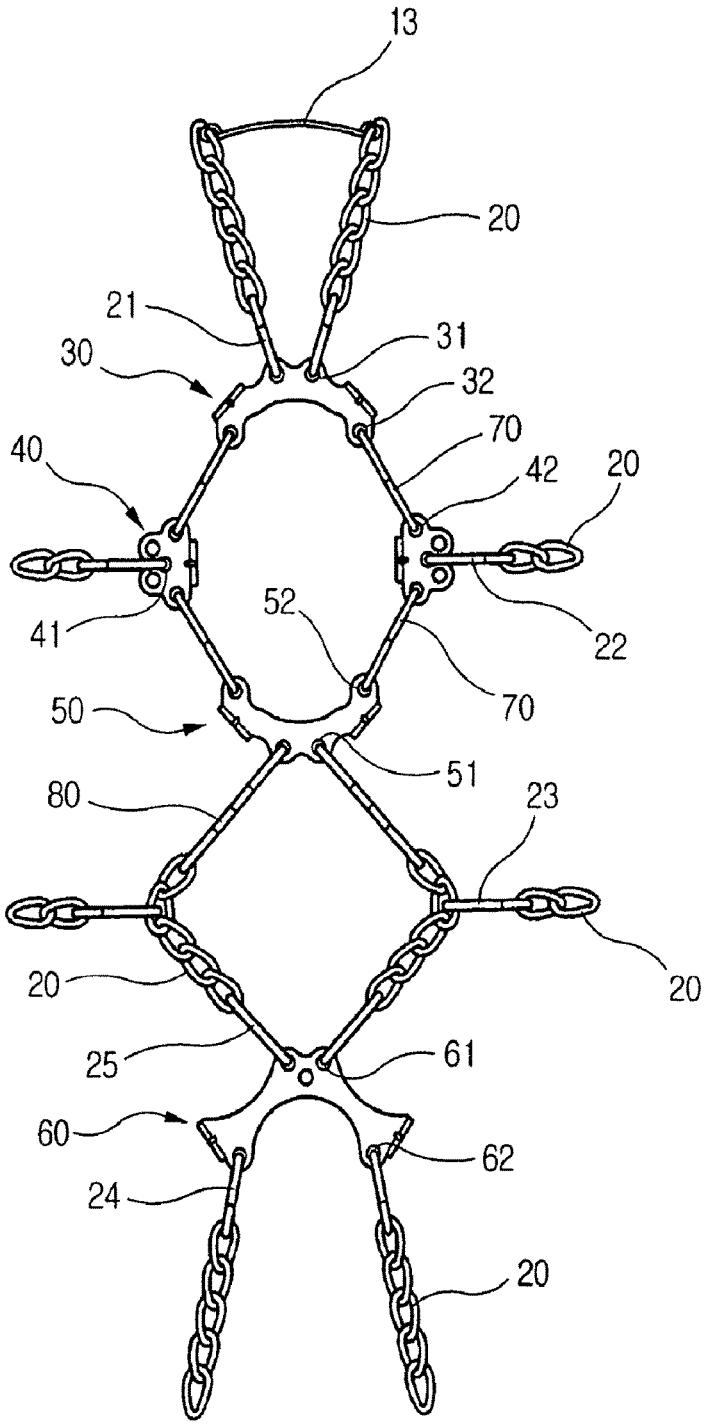
FIG. 5 is an exploded view illustrating the wearing state of the crampons according to a first embodiment of the present invention.
Figure 6:
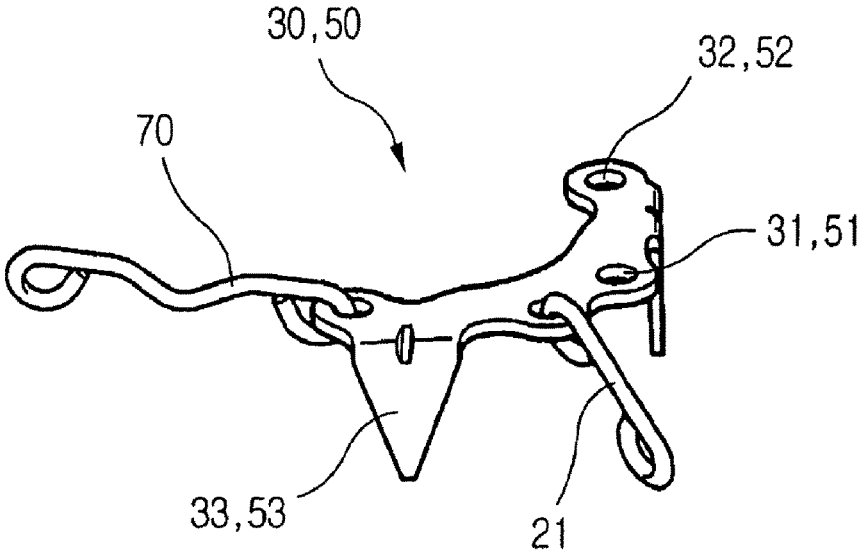
FIG. 6 is a perspective view illustrating a major part of front and center spikes according to a first embodiment of the present invention.
Figure 7:
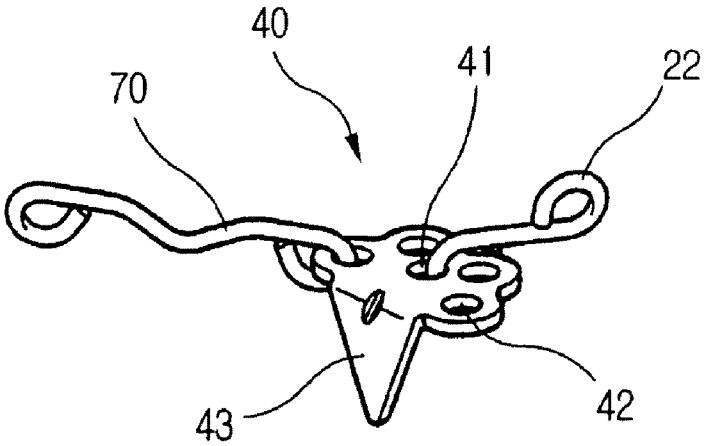
FIG. 7 is a perspective view illustrating a major part of lateral spikes according to a first embodiment of the present invention.
Figure 8:
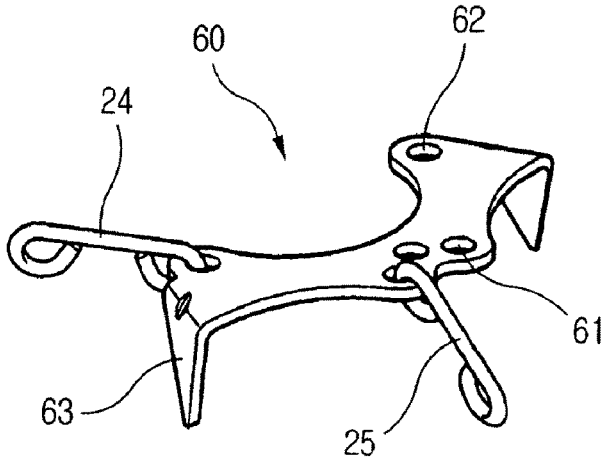
FIG. 8 is a perspective view illustrating a major part of a rear spike according to a first embodiment of the present invention.
Figure 9:
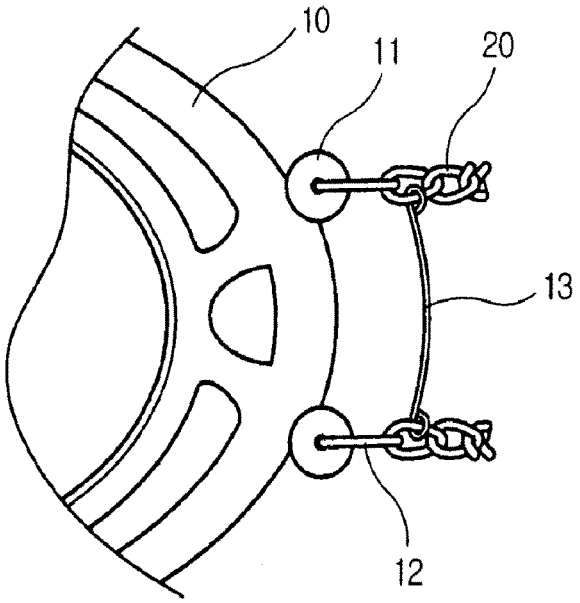
FIG. 9 is a top view illustrating the installed state of a restraining bar according to a first embodiment of the present invention.

A preferred embodiment according to the present invention will now be explained with reference to the accompanying drawings.

The chain-type crampons installed with spikes according to the first embodiment of the present invention, in which an elastic band 10 is bound around an outsole of mountain-climbing boots 1, and chains 20 are coupled to the band 10 as an anti-skid member, is characterized by comprising: a front spike 30, a center spike 50, and a rear spike 60, respectively, disposed at a front portion, a center portion, and a rear portion of a bottom surface of the boots 1, engaged to the chain 20 and coupling rings 21, 23, 24, and 25, and formed with a plurality of spike edges 33, 53, and 63; lateral spikes 40 disposed forward between the front spike 30 and the center spike 50 and engaged to the chain 20 and the coupling ring 22; link rings 70 and 80 each engaged to the front spike 30, the lateral spikes 40, and the center spikes 50; and a circular restraining bar 13 coupled to the lateral spikes 40 tightly attached to a front heel of the boots 1, as shown in FIGS. 1 through 9.

The elastic band 10 made of rubber or synthetic material is adapted to cover the upper portion of the outsole of the boots 1, and bosses 11 protrudes from an outer edge of the band 10 at a desired interval so that fixing rings 12 are mounted to the bosses 11. The chains 20 and the coupling rings 21, 22, 23, and 24 are coupled to a plurality of fixing rings 12 spaced apart from each other at a given interval.

The coupling rings 21, 23, and 24 are coupled to the front, center, and rear spikes 30, 50, and 60 each integrally formed with bent spike edges 33, 53, and 63. The front, center, and rear spikes 30, 50, and 60 are disposed at the front, center, and rear portions on the bottom surface of the boots 1. The lateral spikes 40 are disposed at both sides between the front spike 30 and the center spike 50, and are coupled by the chain 20 and the coupling ring 22.

The front spike 30, the center spike 50, and the rear spike 60, which are disposed at the front, center, and rear portions of the bottom surface of the boots 1, respectively, are formed with fastening holes 31 and 32; 51 and 52; 61 and 62 at both lateral ends and a center portion thereof. Also, the front spike 30, the center spike 50, and the rear spike 60 are bent at the side thereof to integrally form the spike edges 33, 53, and 63.

The lateral spikes 40 disposed at both front sides on the inner bottom surface of the boots 1 are formed with fastening holes 41 and 42 at both lateral ends and center portion, and are bent toward the bottom surface to form the spike edge 43.

The front spike 30, the center spike 50, and the rear spike 60, which are disposed at the front, center, and rear portions of the bottom surface of the boots 1, respectively, are coupled to a plurality of link rings 70 configured to freely pivot. The rear spike 60 is coupled to the center spike 50, the link chain 80, and the chain, with it being mounted to the chain 20 and the coupling ring 24.

The link ring 70 positioned at the front portion of the bottom surface of the boots 1 is bent to be pivotally inserted into is bent to be pivotally inserted into the fastening holes 32, 42, and 52 of the front spike 30, the center spike 50, and the rear spike 60. The front spike 30 and the lateral spikes 40 are coupled to the chain 20 and the band 10 via the fastening holes 31 and 41 formed at center portion and the coupling rings 21 and 22.

The rear spike 60 is disposed at the rear portion of the inner bottom surface of the boots 1, and is coupled to the center spike 50 by connecting the fastening hole 51 of the center spike 50 disposed at the center portion with the fastening hole 61 positioned at the center portion by use of the link ring 80, the chain 20, and the coupling ring 25, with the fastening hole 62 formed at both sides of the elastic ban 10 being mounted with the chain 20 and the coupling ring 80.

The chain-type crampons provided with spikes according to the first embodiment of the present invention includes the front spike 30, the lateral spikes 40, the center spike 50, and the rear spike 60, which are disposed at the front, both sides, center, and rear portions on the inner bottom surface of the boots 1 and have spike edges 33, 43, 53, and 63, respectively, thereby increasing a brake power on a snowy road or icy road.

With the chain-type crampons provided with spikes according to the first embodiment of the present invention, in order to prevent the band 10 tightly attached to the boots 1 from being stretched when the front spike 30, the lateral spikes 40, the center spike 50, and the rear spike 60 are applied with strong frictional force in climbing a steep slope, both chains 20 tightly attached to the front heel of the boots 1 are provided with the circular restraining bar 13, so that the restraining bar 13 is restrained by the front heel portion of the boots 1 to prevent the stretching of the band 10.

Consequently, the first embodiment of the present invention includes the front spike 30, the lateral spikes 40, the center spike 50, and the rear spike 60, respectively, disposed to the front, both sides, center, and rear portions on the inner bottom surface of the boots 1 which comes in contact with the snowy road or icy road, to increase the brake power and thus prevent the slip effectively. Also, the front spike 30, the lateral spikes 40, the center spike 50, and the rear spike 60 are coupled to the link rings 70 and 80 configured to be freely pivoted, thereby solving the existing problem in that the snow is adhered to the boots.

Specifically, the front spike 30, the lateral spikes 40, the center spike 50, and the rear spike 60, respectively, disposed to the front, both sides, center, and rear portions on the inner bottom surface of the boots 1 are coupled to each other by use of the link rings 70 and 80 made of an iron wire to solve the problem in that the snow is adhered to the boots, breaking from the chain structure of the existing crampons.

According to the present invention, the front spike 30, the lateral spikes 40, the center spike 50, and the rear spike 60, respectively, having a plurality of spike edges 33, 43, 53, and 63, are provided to the existing crampons, thereby effectively preventing the slip of the boots 1 on the snowy road or icy road.

Both chains 20 are provided with the circular restraining bar 13, so that the chains 20 are tightly attached to the front heel of the boots 1. Hence, in case the front spike 30, the lateral spikes 40, the center spike 50, and the rear spike 60 are applied with the strong frictional force in climbing a steep slope, the restraining bar 13 is caught by the front heel portion of the boots 1, thereby preventing the band 10 from being stretched and thus maintaining the normal wearing state.

The chain-type crampons installed with spikes according to a second embodiment of the present invention, in which an elastic band 100 is bound around an upper portion of an outsole of mountain-climbing boots 2, and chains 200 are coupled to the band 100 as an anti-skid member, is characterized in that a plurality of spikes 300 are disposed at a front portion, a center portion, a rear portion, and both sides between the front portion and the center portion on a bottom surface of the boots 2, and the spike is bent downwardly to form at least one spike edge 310, and is formed with a plurality of fastening holes 320, as shown in FIGS. 10 through 13.

Figure 11:
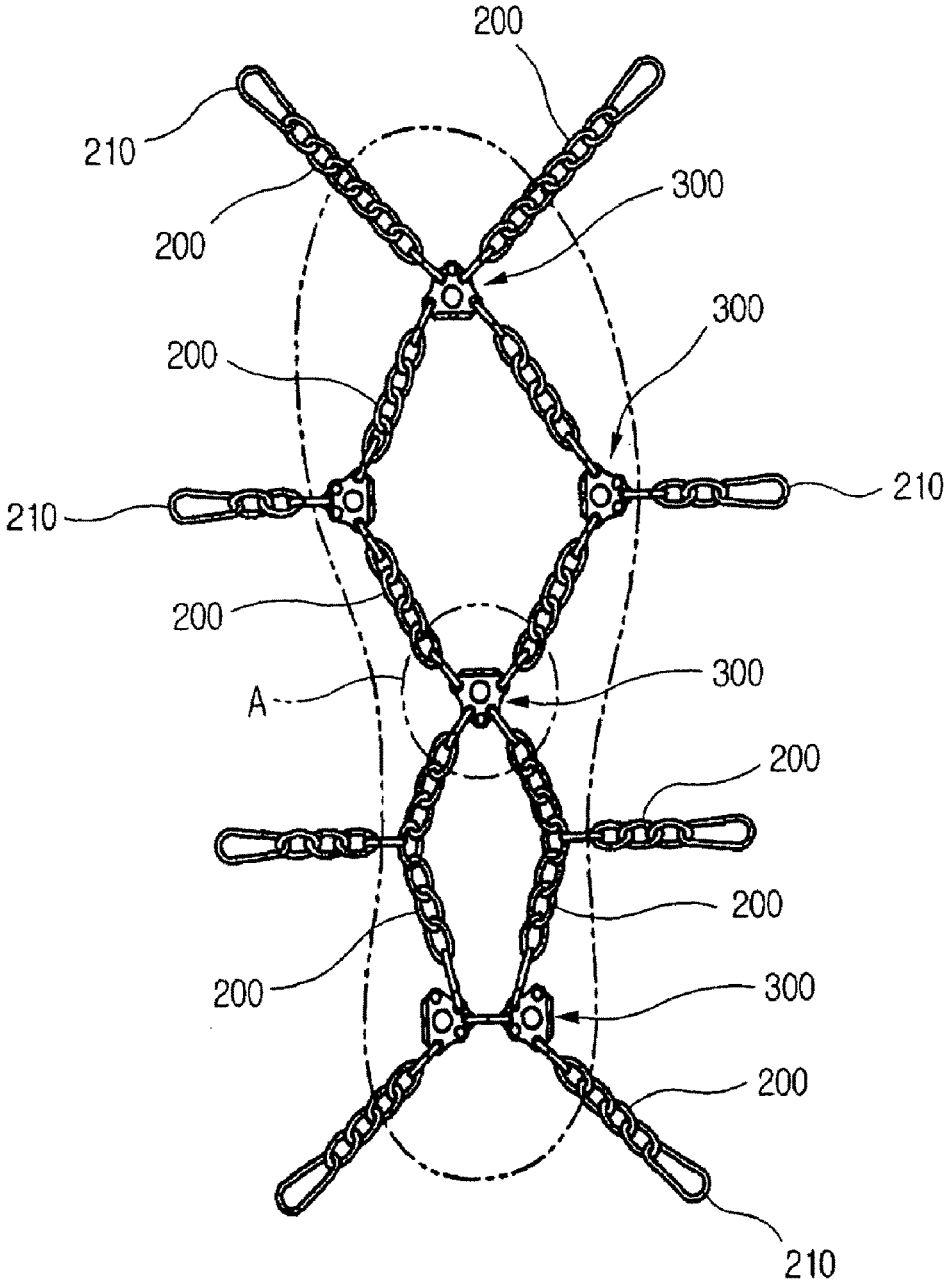
FIG. 11 is a top view illustrating the removed state of crampons according to a second embodiment of the present invention.

As shown in FIG. 11, the crampons of the present invention includes a plurality of spikes 300, a plurality of chains 200 for coupling the spikes 300, and a plurality of fixing rings 210 for coupling the spikes 300 and the chains 200 with a fixing portion 110 of the band 100.

A plurality of spikes 300 are adapted to hold the chain 200 and the chain 200. The number of the spikes 300 may be varied depending upon the use of the crampons (for example, climbing a mountain, climbing an ice ridge, or the like). If the number and position of the spikes 300 are varied, the number of the chains 200 coupling the spikes 300 and the number of the link rings 210 coupling the spikes 300 and the band 100 may be varied.

Preferably, the spikes 300 having the spike edges 310 are installed to the chains 200 forming the anti-skid member, in order to balance the boots 2 with the crampons according to the present invention with respect to the ground.

Figure 12:
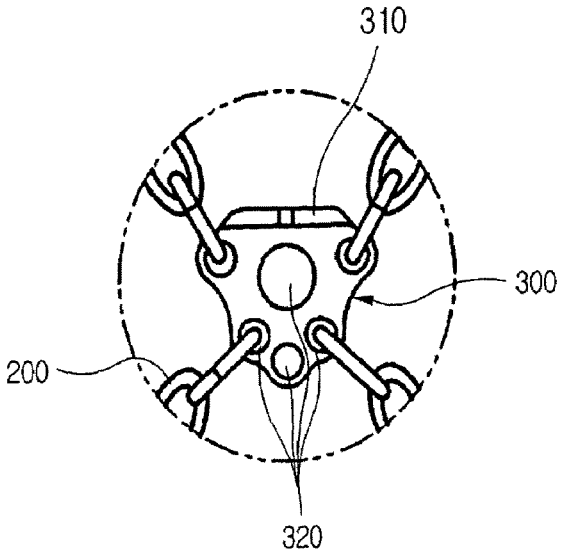
FIG. 12 is an enlarged view of a portion 'A' in FIG. 11.

FIG. 12 is an enlarged view of the spike 300 of the crampons according to the present invention. As shown in FIG. 12, the spike 300 has a triangular shape, and is formed with a plurality of fastening holes 320. Any one of three corners of the triangle is downwardly bent to form a spike edge 310 corresponding to the outsole of the boots 2.

The number of the fastening holes 320 formed in the spike 300 is selected to exceed the sum of the number of the chains 200 for coupling the spike 300 with other spike 300 and the number of the coupling rings 210 for coupling the chain 200 with the band 100. Preferably, the fastening holes 320 among a plurality of fastening holes 210, through which the chain 200 passes, are formed in the spike 300 in balance.

Figure 13:
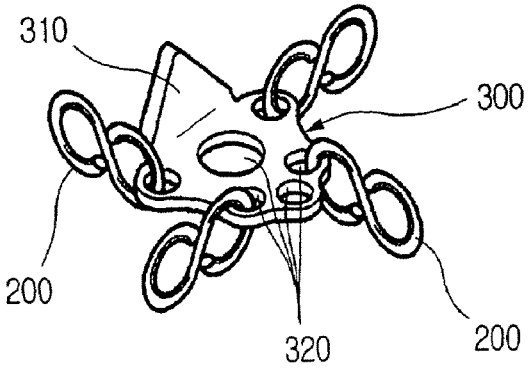
FIG. 13 is a perspective view illustrating a major part of a spike according to a second embodiment of the present invention.

Referring to FIG. 13, the spike edge 310 is formed by bending a corner area of the spike 300 downwardly. In case the crampons according to the present invention are installed to the boots 2, the spike edge 310 formed on the spike 300 faces the ground. Further, one or more spike edge 310 may be provided to the spike 300.

Although it is described in that the spike 300 has the triangular shape, the spike may be formed in other shape (for example, circular or polygonal shape). If the shape of the spike 300 is changed, the number and position of the fastening holes 320 formed in the spike 3200 and the position of the spike edge 310 may be varied.

Referring again to FIG. 11, the chain 200 couples other spikes 300 to each other to maintain the spacing between the spikes 300.

One end of the fixing ring 210 is engaged to the chain 200, and the other end is engaged to the fixing portion 110 of the band 100, thereby coupling the chain 200 with the band 100. In the present invention, the chain forming the anti-skid member is made of a chain structure, but a spring structure of a twist structure made by twisting a plurality of metal wires may be provided.

Figure 10:
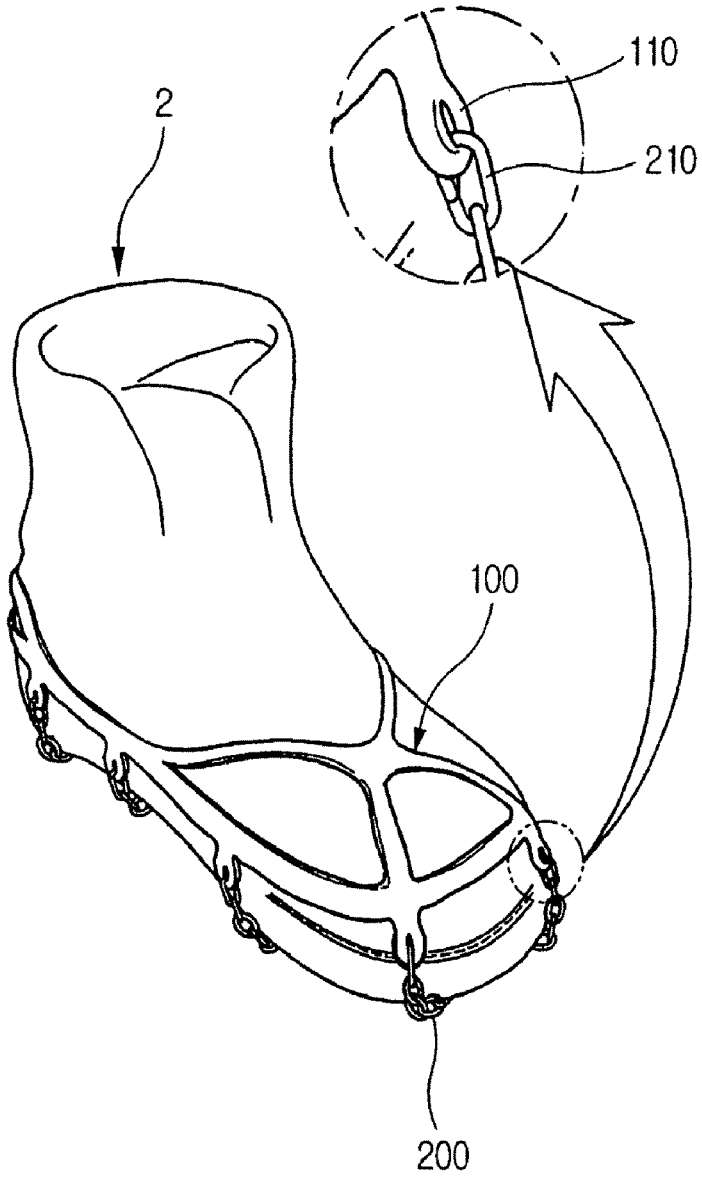
FIG. 10 is a perspective view illustrating the wearing state of crampons according to a second embodiment of the present invention.

Explaining the coupling state between the band 100 and the chain 200 forming the anti-skid member with reference to FIG. 10, the band 100 is provided with the fixing portion 110 formed in a circular ring shape to couple the fixing ring 210 of the chain 200. The fixing portion 110 is coupled to one end of the fixing ring 210 in an unopenable fashion. Specifically, the band 100 is integrally formed with the chain 200 not to disassemble the band and the chain. In this case, it is preferable that the number of the fixing portions 110 is equal to that of the fixing rings 210 provided to the chain 200.

Although it is described in that the fixing portion 110 formed on the band 100 is coupled to the fixing ring 210 in the unopenable fashion by integrally forming the band 100 and the chain 200, the fixing ring 210 of the chain 200 coupled to the fixing portion 110 may be formed in an openable ring to divide the chain 200 from the band 100.

Further, although it is described in that the fixing portion 110 is formed in a circular ring shape on the band 100, the fixing portion 110 may be formed in a through-hole penetrating a plate of the band 100, or in other shapes of which a catching hook (for example, U-shaped ring) is attached on the band 100, so that it can be coupled to the fixing ring 210 of the chain 200 forming the anti-skid member.

As shown in FIG. 10, the fixing ring 110 formed in a circular ring shape on the band is engaged to the fixing ring 210 of the chain 200 forming the anti-skid member, thereby forming the band 100 and the chain 200 in one unit. The band 100 is made of elastic deformable rubber, which covers the boots partially. Since the band 100 is made of elastic deformable rubber, the crampons 2 of the present invention may be easily worn or removed on or from any kinds of footwear, regardless of a size or shape of the mountain-climbing boots. The band 100 may be made of a semi-organic polymer comprising silicon which has good heat resistance and insulating property.

The chain-type crampons provided with the spikes according to the second embodiment of the present invention have an advantage of effectively preventing the boots from being slipped when climbing or walking the mountain in the winter season, by providing the chains 200 and spikes 300 for coupling the chains 200 and formed with the spike edges 310. Further, the crampons of the present invention may be easily put on the mountain-climbing boots by using the band 100 made of elastic rubber, regardless of a length and shape of the boots. Also, the user can easily wear or remove the crampons on or from the boots.

With the above description, the chain-type crampons of the present invention having the elastic band and the chains mounted on the band are provided with a plurality of spikes and link rings, so that the brake power on the snowy road or icy road is increased, and the snow is not adhered to the crampons. In particular, the restraining bar is installed to the front portion of the boots, thereby increasing the binding force of the crampons.

The forgoing embodiments are merely exemplary and are not to be construed as limiting the present invention. The present teachings can be readily applied to other types of apparatus. The description of the present invention is intended to be illustrative, and not to limit the scope of the claims. Many alternatives, modifications, and variations will be apparent to those skilled in the art.

What is claimed is:

1. Chain-type crampons provided with spikes, in which an elastic band is adapted to be bound around an outsole of mountain-climbing boots, and chains are coupled to the band as an anti-skid member, the crampons comprising:

a front spike, a center spike, and a rear spike, respectively, positioned to be disposed at a front portion, a center portion, and a rear portion of a bottom surface of the boots when the elastic band is bound around the outsole of the boots, said spikes being formed with a plurality of spike edges;

lateral spikes disposed forward between the front spike and the center spike, wherein the front spike, center spike, rear spike and lateral spikes are each operatively engaged to the chain via coupling rings;

link rings each engaged to the front spike, the lateral spikes, and the center spikes; and a curved restraining bar coupled to at least two chains of the chain and operatively coupled to the front spike, the curved restraining bar being engaged with a front of the boots when the elastic band is bound around the outsole of the boots.

2. The crampons as claimed in claim 1, wherein the front spike, the center spike, and the rear spike, respectively, are formed with fastening holes at both lateral ends and a center portion thereof, and the front spike, the center spike, and the rear spike are bent at the side thereof to integrally form the spike edges.

3. Chain-type crampons provided with spikes in which an elastic band is adapted to be bound around an upper portion of an outsole of mountain-climbing boots and extend from a front portion to a rear portion of the boot when bound around the boot, and chains are coupled to the band as an anti-skid member, the crampons comprising:

a plurality of spikes that are operatively coupled to the elastic band via chains and positioned to be disposed at a front portion, a center portion, a rear portion, and both sides between the front portion and the center portion on a bottom surface of the boots when the elastic band is bound around the outsole of the boots, wherein the spikes are bent downwardly to form at least one spike edge, and are formed with a plurality of fastening holes *and a restraining bar coupled to at least two chains and being engaged with a front of the boots when the elastic band is bound around the outsole of the boots.*

4. The crampons as claimed in claim 3, wherein the band is formed with fixing portions of a circular ring shape for coupling the chains.

5. The crampons as claimed in claim 4, wherein the chains have a fixing ring.

6. The crampons as claimed in claim 3, wherein the spikes have a triangular shape, and are formed with a plurality of fastening holes, and wherein any one of three corners of the triangle is downwardly bent to form a spike edge.

*7. Chain-type crampons provided with spikes in which an elastic band is adapted to be bound around an upper portion of an outsole of mountain-climbing boots and extend from a front portion to a rear portion of the boot when bound around the boot, and chains are coupled to the band as an anti-skid member, the crampons comprising:*

*a plurality of spikes that are operatively coupled to the elastic band via chains and positioned to be disposed at a front portion, a center portion, a rear portion, and both sides between the front portion and the center portion on a bottom surface of the boots when the elastic band is bound around the outsole of the boots, wherein the spikes are bent downwardly to form at least one spike edge, and are formed with a plurality of fastening holes and a restraining bar caught by the front heel portion of the boots to prevent the band from being stretched.*

*8. The crampons as claimed in claim 7, wherein the restraining bar is curved.*

*9. Chain-type crampons provided with spikes in which an elastic band is adapted to be bound around an upper portion of an outsole of mountain-climbing boots and extend from a front portion to a rear portion of the boot when bound around the boot, and chains are coupled to the band as an anti-skid member, the crampons comprising:*

*a plurality of spikes that are operatively coupled to the elastic band via chains and positioned to be disposed at a front portion, a center portion, a rear portion, and both sides between the front portion and the center portion on a bottom surface of the boots when the elastic band is bound around the outsole of the boots, wherein the spikes are bent downwardly to form at least one spike edge, and are formed with a plurality of fastening holes and a restraining bar engaged with the front of the boots when the elastic band is bound around the outside of the boots to prevent the band from being stretched.*

*10. The crampons as claims in claim 9, wherein the restraining bar is curved.*

*11. Chain-type crampons provided with spikes in which an elastic band is adapted to be bound around an upper portion of an outsole of mountain-climbing boots and extend from a front portion to a rear portion of the boot when bound around the boot, and chains are coupled to the band as an anti-skid member, the crampons comprising:*

*a plurality of spikes that are operatively coupled to the elastic band via chains and positioned to be disposed at a front portion, a center portion, a rear portion, and both sides between the front portion and the center portion on a bottom surface of the boots when the elastic band is bound around the outsole of the boots, wherein the spikes are bent downwardly to form at least one spike edge, and are formed with a plurality of fastening holes and a restraining bar coupled to at least two chains of the chain and being engaged with a front of the boots when the elastic band is bound around the outsole of the boots to prevent the band from being stretched.*

*12. The crampons as claimed in claim 11, where in the restraining bar is curved.*

*13. Chain-type crampons provided with spikes in which an elastic band is adapted to be bound around an upper portion of an outsole of mountain-climbing boots and extend*

*from a front portion to a rear portion of the boot when bound around the boot, and chains are coupled to the band as an anti-skid member, the crampons comprising:*

*a plurality of spikes that are operatively coupled to the elastic band via chains and positioned to be disposed at a front portion, a center portion, a rear portion, and both sides between the front portion and the center portion on a bottom surface of the boots when the elastic band is bound around the outsole of the boots, wherein the spikes are bent downwardly to form at least one spike edge, and are formed with a plurality of fastening holes and means for preventing the front of the band from being stretched when the elastic band is bound around the outside of the boots.*

*14. The crampons as claimed in claim 13, wherein the means for preventing comprises a curved restraining bar.*

* * * * *